United States Patent [19]
Koishi et al.

[11] Patent Number: 5,591,962
[45] Date of Patent: Jan. 7, 1997

[54] SYNCHRONOUS SIGNAL DETECTION APPARATUS WITH A PHOTOCONDUCTIVE PHOTODETECTOR

[75] Inventors: Musubu Koishi; Akira Takeshima; Mitsunori Nishizawa, all of Hamamatsu, Japan

[73] Assignee: Hamamatsu Photonics K.K., Hamamatsu, Japan

[21] Appl. No.: 498,984

[22] Filed: Jul. 6, 1995

[30] Foreign Application Priority Data

Jul. 6, 1994 [JP] Japan ............................ 6-154903

[51] Int. Cl.⁶ .................................................. H01J 40/14
[52] U.S. Cl. ..................... 250/214.1; 250/214 R
[58] Field of Search ......................... 250/214.1, 214 R, 250/214 P, 214 C; 372/25–28, 700; 327/141–143, 149, 237, 98; 359/152, 162, 177, 182–184; 356/349–350

[56] References Cited

U.S. PATENT DOCUMENTS

| | | | |
|---|---|---|---|
| 4,658,217 | 4/1987 | Takatori et al. | 327/98 |
| 4,883,358 | 11/1989 | Okada | 356/350 |
| 5,003,268 | 3/1991 | Tsuchiya | 372/25 |

OTHER PUBLICATIONS

Sugeta et al, "Metal–Semiconductor–Metal Photodetector for High–Speed Optoelectronic Circuits", Proceedings of the 11th Conference (1979 International) on Solid State Devices, Tokyo, 1979; Japanese Journal of Applied Physics, vol. 19 (1980) Supplement 19–1, pp. 459–464, Jan. 1979.

Liu et al, "Controlled Nonlinearity Monolithic Integrated Optoelectronic Mixing Receiver", IEEE Photonics Technology Letters, vol. 5, No. 12, Dec. 1993, New York, pp. 1403–1406.

Philp et al, "A Simple Fibre Optic Sensor for Measurment of Vibrational Frequencies", Measurment Science & Technology, vol. 3, No. 6, Jun. 1992, pp. 603–606.

*Primary Examiner*—Que T. Le
*Attorney, Agent, or Firm*—Cushman Darby & Cushman IP Group of Pillsbury Madison & Sutro LLP

[57] ABSTRACT

A photoconductive photodetector to which a modulation voltage signal having a predetermined frequency is applied receives a signal to be measured ($I_f$) while adjusting the phase of a modulation signal by a phase shifter. A current-to-voltage conversion unit extracts a DC component of a current signal generated at the photoconductive photodetector in correspondence with the intensity of a predetermined frequency component of the signal to be measured ($I_f$) as a voltage signal. The maximum value of DC voltage values ($V_O$) obtained in every setting operation of a phase adjustment value is identified. The maximum value corresponds a case in which the modulation voltage signal and the predetermined frequency component of the signal to be measured ($I_f$) are in phase. The intensity of the predetermined frequency component of the signal to be measured ($I_f$) is calculated. As a result, a high-speed phenomenon can be measured with a high precision.

8 Claims, 17 Drawing Sheets

BASIC ARRANGEMENT

CONSTANT INCIDENT
LIGHT AMOUNT

CONSTANT INCIDENT
LIGHT AMOUNT

CONSTANT INCIDENT
LIGHT AMOUNT

φ : PHASE DIFFERENCE
A : AMPLITUDE OF VOLTAGE SIGNAL
B : INTENSITY 1 OF INCIDENT LIGHT BEAM
C : INTENSITY 2 OF INCIDENT LIGHT BEAM

Φ : PHASE DIFFERENCE
A : AMPLITUDE OF VOLTAGE SIGNAL
Io: INTENSITY OF INCIDENT LIGHT BEAM AVERAGE VALUE
B : INTENSITY OF INCIDENT LIGHT BEAM MODULATION AMPLITUDE

SYNCHRONOUS SIGNAL DETECTION APPARATUS WITH A PHOTOCONDUCTIVE PHOTODETECTOR

BACKGROUND OF THE INVENTION

1. Field of the Invention

The present invention relates to a synchronous signal detection apparatus for synchronously detecting a predetermined frequency component of a signal to be measured.

2. Related Background Art

Generally, a noise intensity depends on the range of a frequency band. The influence of noise can be reduced by realizing a stable bandpass filter for selecting frequencies only close to a frequency to be measured. As an excellent system therefore, a lock-in amplifier is well-known.

FIG. 1 is a block diagram snowing the arrangement of a typical conventional lock-in amplifier. As shown in FIG. 1, in this apparatus, a light beam to be measured is received by a photodetector 910 constituted by an avalanche photodiode, and converted into an electrical signal. This electrical signal is amplified by an amplifier 920. A signal is output from an oscillator 930, and its phase is adjusted by a phase adjustment circuit 940. This signal having a frequency to be measured and the signal output from the amplifier are input to a phase detection circuit 950, and their phases are detected. Thereafter, a signal is extracted in accordance with a frequency region close to the frequency to be measured, and output via a low-pass filter 960.

SUMMARY OF THE INVENTION

The present invention has as its object to provide a synchronous signal detection apparatus which can measure a high-speed phenomenon with a high precision, and realize a decrease in size.

The synchronous signal detection apparatus of the present invention is a synchronous signal detection apparatus for measuring a frequency component of a signal to be measured, and comprises (a) a phase adjustment unit for receiving an electrical signal having a predetermined frequency, and changing a phase of an output signal in accordance with an external designation, (b) a voltage application unit for receiving the electrical signal output from the phase adjustment unit, and outputting a first voltage signal at a low output impedance, (c) a photoconductive photodetector, having a voltage application terminal to which the voltage signal output from the voltage application unit is input, for receiving the signal to be measured, and (d) a current-to-voltage conversion unit for converting a current signal flowing through the photoconductive photodetector into a voltage signal, and extracting an almost DC component to be output as a second voltage signal, wherein an intensity of a component of the predetermined frequency included in the signal to be measured is detected.

The synchronous signal detection apparatus can be constituted by further comprising bias adjustment means for adjusting an operating bias voltage of the photoconductive photodetector.

The synchronous signal detection apparatus can be constituted by further comprising a frequency selector for selecting the same frequency component as the predetermined frequency, and outputting the frequency component to the voltage application unit.

The synchronous signal detection apparatus can be constituted by further comprising a data processing unit for informing the phase adjustment unit of an adjustment value, and receiving the second voltage signal output from the current-to-voltage conversion unit to calculate a phase and intensity of the signal to be measured.

The synchronous signal detection apparatus can be constituted by further comprising non-linearity correction means for receiving the second voltage signal output from the current-to-voltage conversion unit, and correcting non-linearity of the voltage signal output from the current-to-voltage conversion unit with respect to an intensity of an input light beam, the non-linearity being inherent to response characteristics of the photoconductive photodetector.

In the synchronous signal detection apparatus of the present invention, the photoconductive photodetector preferably has an arrangement in which, when an intensity of an incident signal is constant and a value of an applied voltage is an independent variable, an amount of a current flowing through the photoconductive photodetector is an almost odd function of the applied voltage in a predetermined domain including the value of the applied voltage of 0 V, and when the applied voltage is constant and a value of the intensity of the incident signal is an independent variable, the amount of the current flowing through the photoconductive photodetector is an almost linear function of the intensity of the incident signal in the predetermined domain; and the voltage signal applied to the photoconductive photodetector is periodic and has a time average value of almost zero and an amplitude represented as an even function of a time when an origin is set at time of a middle point between adjacent times at which the amplitude becomes zero. A practical photoconductive photodetector is a metal/semiconductor/metal (MSM) photodetector. A photodetector using GaAs, InP, GaP, InGaAs, HgCdTe, CdS, CdSe, or PbS as a photodetecting material can be suitably used.

In the synchronous signal detection apparatus of the present invention, after the phase of a modulation signal having a predetermined frequency is adjusted by the phase adjustment unit, The obtained modulation signal is applied as a modulation voltage signal to the voltage application terminal of the photoconductive photodetector through the voltage application unit. In this state, the photoconductive photodetector receives a signal to be measured. On the other hand, since the modulation voltage signal is applied to the photoconductive photodetector in the above manner, the signal to be measured is synchronously detected using the modulation voltage signal. As a result, a modulation current signal flowing through the photoconductive photodetector includes a DC component having a value in accordance with as the product value of a modulation frequency component of the signal to be measured and the modulation frequency component of the modulation voltage signal. The modulation current signal is input to the current-to-voltage conversion unit to be converted into a voltage signal. At the same time, only an almost DC component is selected to be output as a signal output from the synchronous signal detection apparatus. That is, in the synchronous signal detection apparatus of the present invention, the photoconductive photodetector performs all processing with respect to a signal having a high frequency. After the signal is converted into a signal within a frequency region which can be easily electrically processed, the signal is electrically amplified, and then a measurement operation is executed.

If a periodic voltage signal whose time average value is almost 0 and which is an almost even function of the time using, as the origin, time at a middle point between adjacent times whose amplitudes are 0 is selected as the voltage signal applied to the photoconductive photodetector, a DC component of a background light beam can be removed, and also an alternating background light beam except for the frequency of the modulation voltage signal can be reduced. Then, a measurement operation is executed.

The synchronous signal detection apparatus employs the photoconductive photodetector in a receiving unit of a signal to be measured. After a modulation signal having the same frequency as a frequency component to be measured is applied to the photoconductive photodetector to perform synchronization, the intensity of the frequency component of the signal to be measured is measured by measuring a DC component. With this arrangement, the intensity of a predetermined frequency component can be measured with a high S/N ratio in a wide dynamic range during a change in intensity of the signal to be measured.

In addition, if a photoconductive photodetector capable of high-speed response, such as an MSM photodetector, is employed as a photoconductive photodetector, the photoconductive photodetector processes a high-speed signal, and electric circuits in the subsequent stage of the photoconductive photodetector process a low-speed signal. Therefore, even if a high-speed change in intensity of a light beam to be measured is to be measured, the intensity of a predetermined frequency of the signal to be measured which changes at a high speed can be measured by a simple apparatus at a high S/N ratio in a wide dynamic range.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
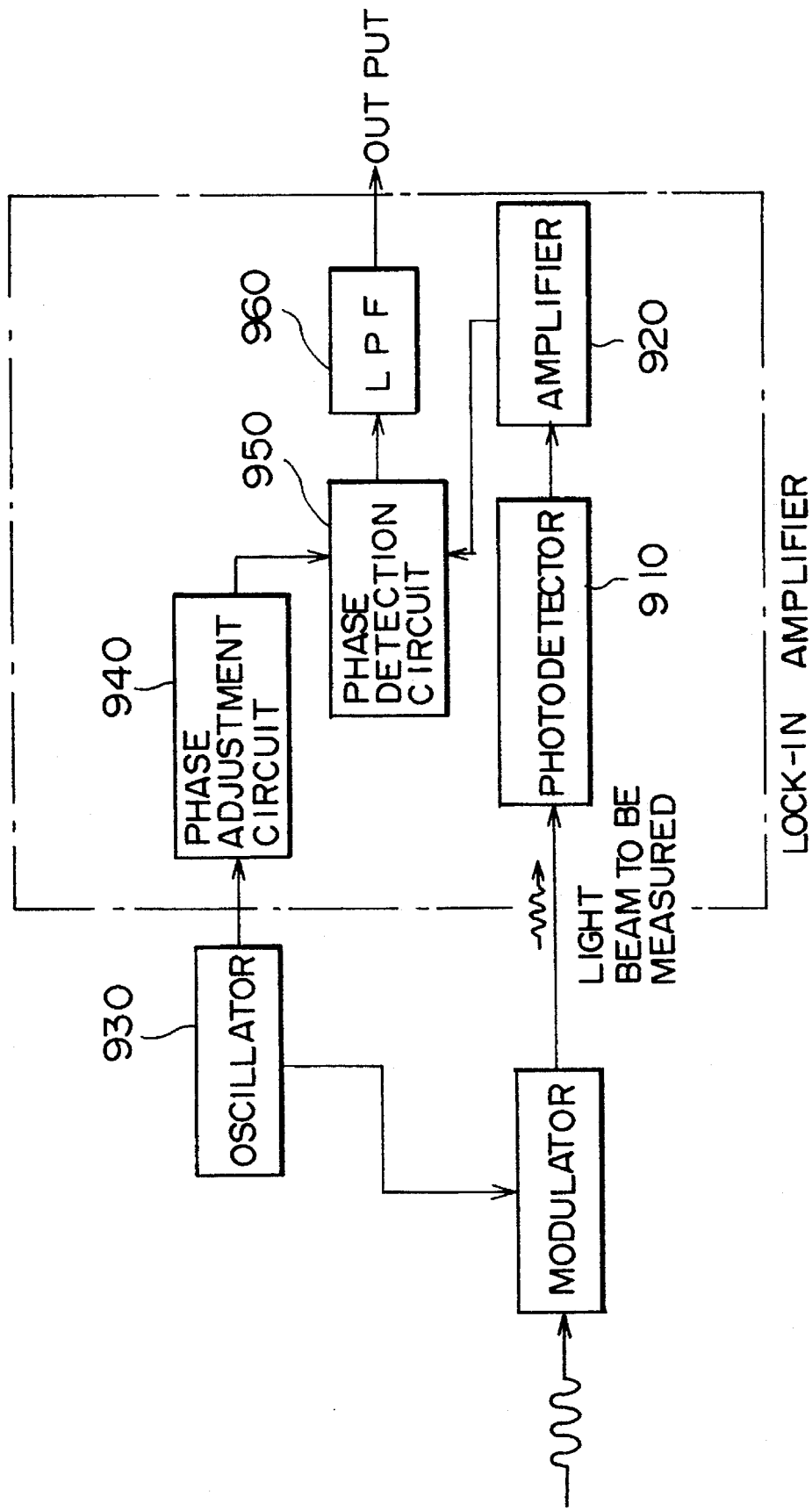
FIG. 1 is a block diagram showing the arrangement of a conventional lock-in amplifier.

Embodiments of the present invention will be described below with reference to the accompanying drawings. The same reference numerals denote the same parts throughout the drawings, and a repetitive description thereof will be omitted.

Figure 2:
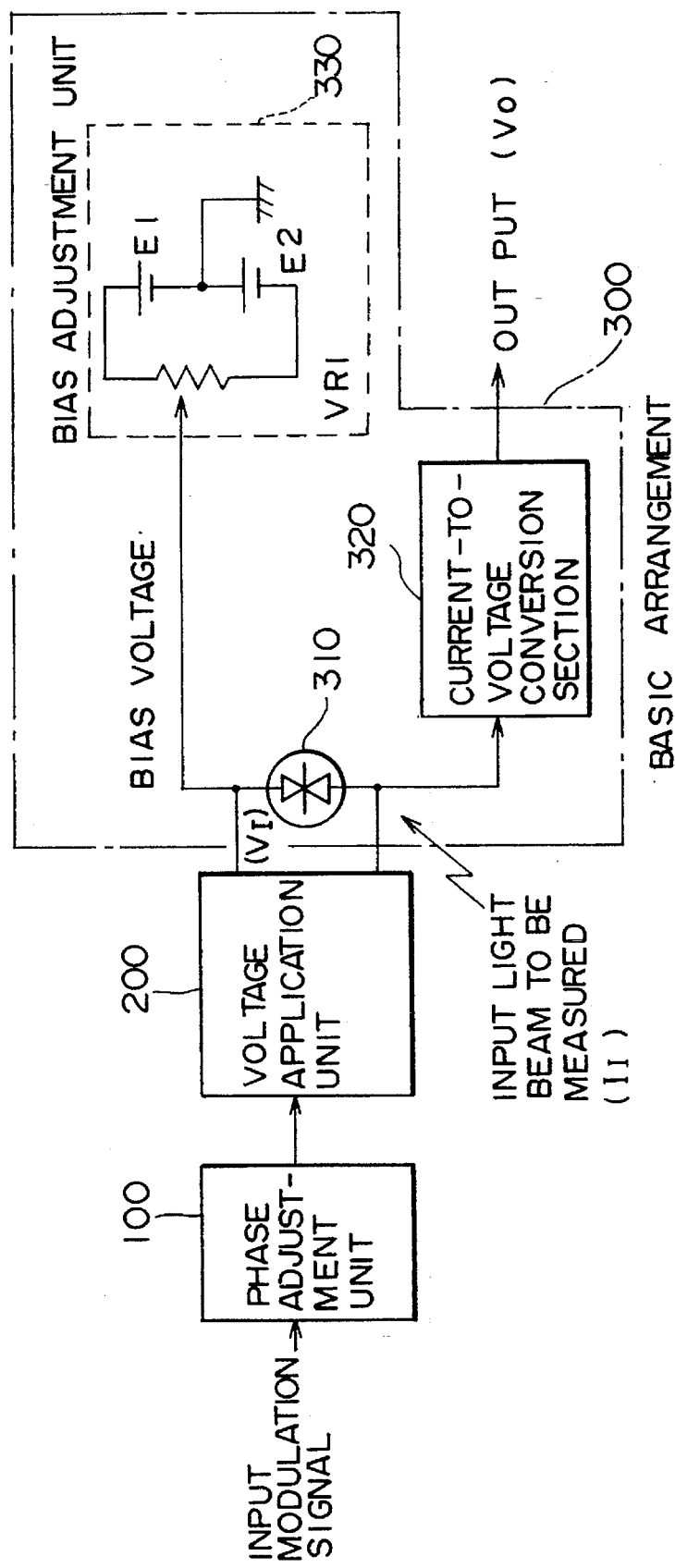
FIG. 2 is a block diagram showing the basic arrangement of the main part of a synchronous signal detection apparatus according to the present invention.

FIG. 2 is a block diagram showing the basic arrangement of the main part of a synchronous signal detection apparatus according to the present invention. This apparatus comprises, as its main part, (a) a phase adjustment unit 100, (b) a voltage application unit 200, and (c) a photodetecting unit 300. The phase adjustment unit 100 receives an external electrical signal having a predetermined frequency and adjusts its phase by changing a time between the signal input and the signal output. The voltage application unit 200 receives the electrical signal output from the phase adjustment unit 100 and outputs a voltage signal ($V_I$) at a low output impedance. The photodetecting unit 300 receives the voltage signal ($V_I$) output from the voltage application unit 200, and also receives a light beam to be measured to output an output voltage signal ($V_O$) in accordance with the intensity of a predetermined frequency component of the light beam to be measured, and a phase difference between the predetermined frequency component of the light beam to be measured and the voltage signal ($V_I$).

The photodetecting unit 300 comprises ① a photoconductive photodetector 310, and ② a current-to-voltage conversion unit 320. The photoconductive photodetector 310 has a voltage application terminal for receiving the voltage signal ($V_I$) output from the voltage application unit 200, and receives a light beam to be measured. The current-to-voltage conversion unit 320 converts a current signal flowing through the photoconductive photodetector 310 into a voltage signal, and extracts an almost DC component to output the component as the voltage signal ($V_O$). The above ① and ② are indispensable elements of the photodetecting unit in the synchronous signal detection apparatus according to the present invention. As shown in FIG. 2, the photodetecting unit 300 preferably comprises ③ a bias adjustment unit 330 for setting the operation of the photoconductive photodetector 310 so as to set an output current value to 0 in response to incidence of a DC light beam such as a background light beam.

Figure 3:
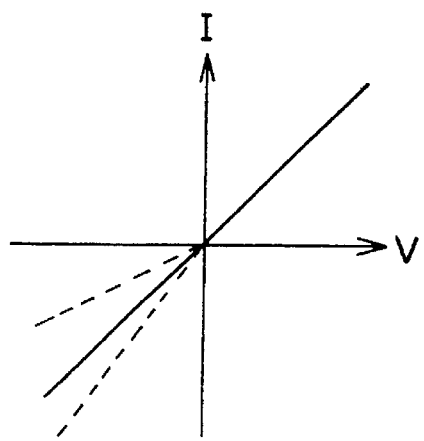
FIGS. 3, 4, and 5 are graphs for explaining the characteristics of a photoconductive photodetector.
Figure 4:
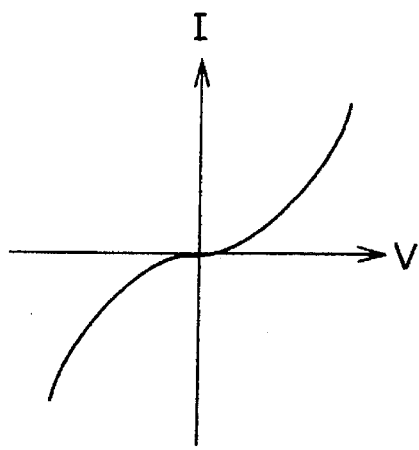
Figure 5:
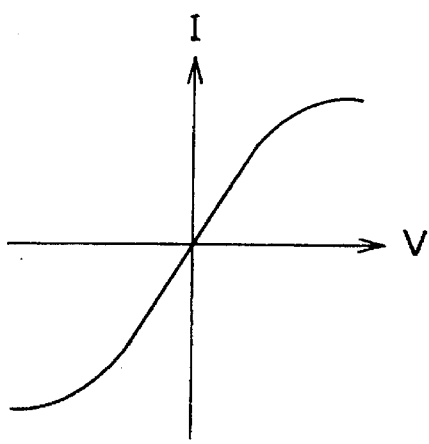

The photoconductive photodetector 310 is constituted by a metal/semiconductor/metal (MSM) photodetector using GaAs as a material. The photoconductive photodetector 310 has characteristics that the amount of a current flowing through the photoconductive photodetector is an odd function of an applied voltage in a predetermined domain including an applied voltage value of 0 V when the amount of an incident light beam is constant and an applied voltage value is an independent variable. FIGS. 3 to 5 are graphs illustrating the characteristics of the photoconductive photodetector 310 available to the synchronous signal detection apparatus of the present invention.

Figure 6:
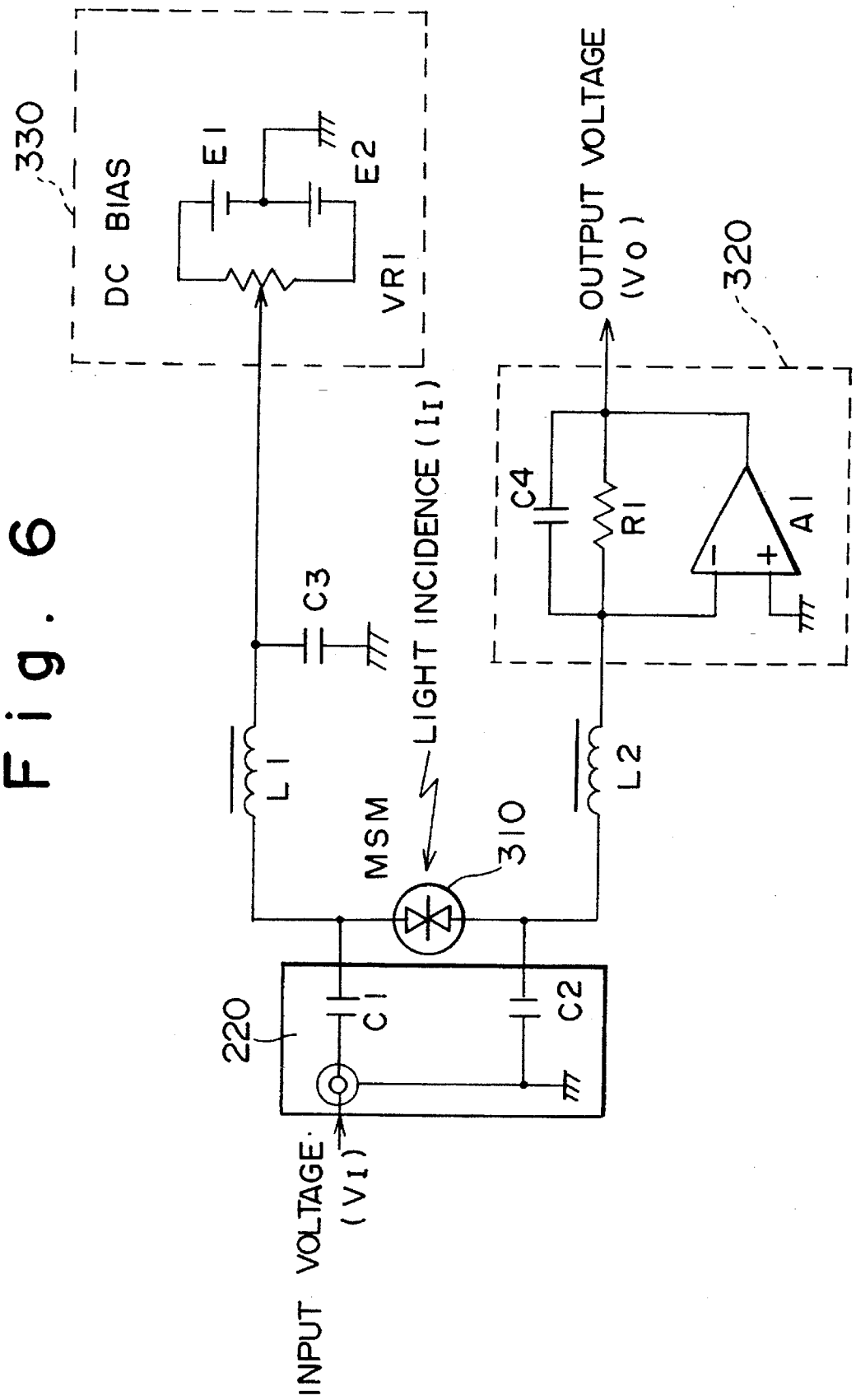
FIG. 6 is a circuit diagram showing the first arrangement of the main part of the synchronous signal detection apparatus according to the present invention.
Figure 8:
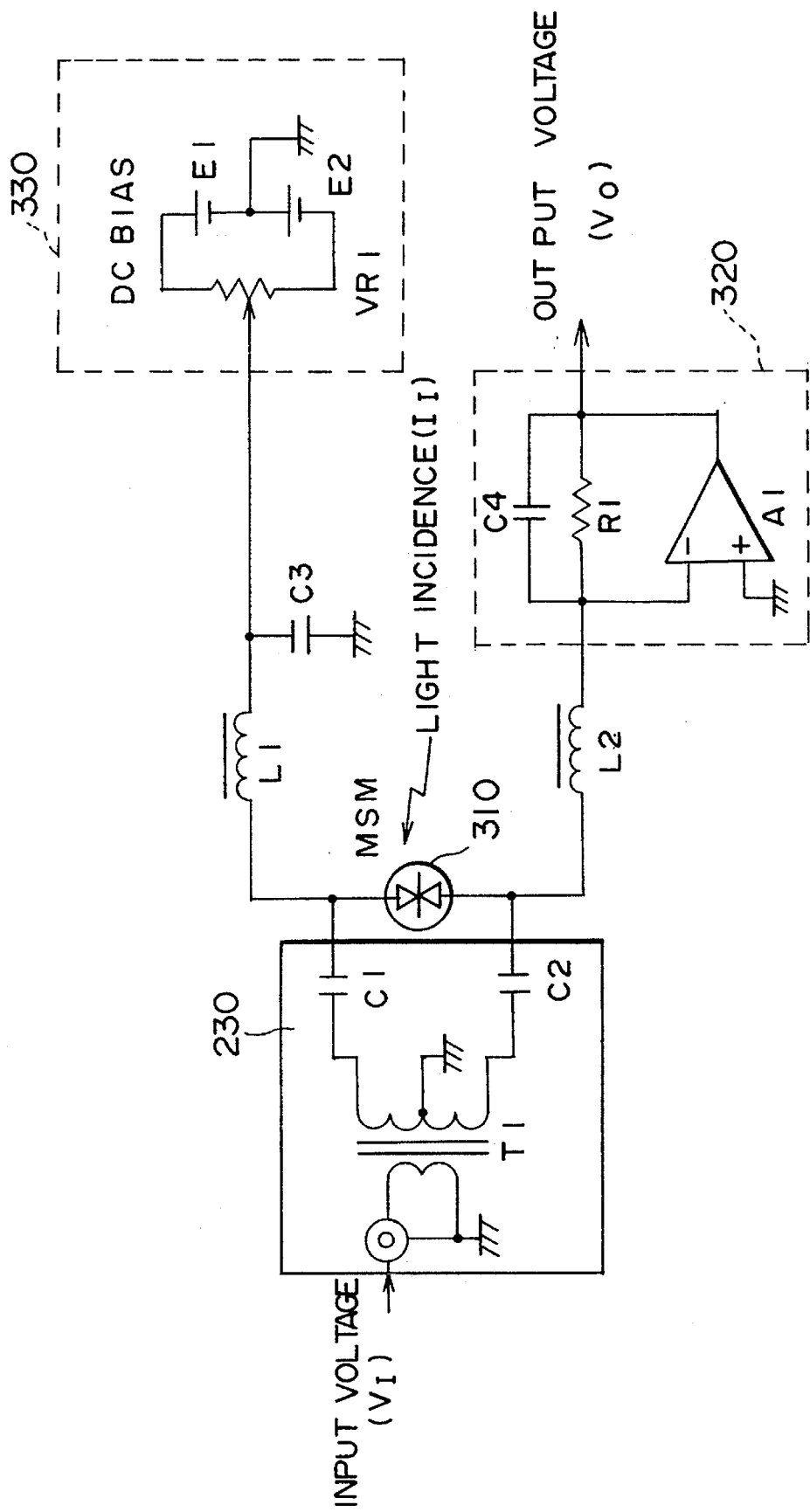
FIG. 8 is a circuit diagram showing the third arrangement of the main part of the synchronous signal detection apparatus according to the present invention.

FIG. 6 is a circuit diagram showing an example of mutual connection between the photoconductive photodetector 310, the current-to-voltage conversion unit 320, and the bias adjustment unit 330, and a detailed circuit for the voltage application unit. In the example of FIG. 8, a voltage application unit 220 is constituted by capacitors C1 and C2. As shown in FIG. 6, the current-to-voltage conversion unit 320 is constituted by an operational amplifier A1, a resistor R1, and a capacitor C4. An input AC current signal is converted into a voltage by the resistor R1. Further, the integral is executed in accordance with a time constant determined by the product of a capacitance value of the capacitor C4 and a resistance value of the resistor R1, and the arithmetic operation of a time average value is executed to output an almost DC voltage.

The bias adjustment unit 330 is constituted by a variable resistor VR1 for adjusting a bias voltage value, and DC power supplies E1 and E2 connected in series with each other and connected to the terminals of the variable resistor VR1. The connection point between the DC power supply E1 and the DC power supply E2 is grounded.

A voltage signal output from the voltage application unit 220 is applied to the voltage application terminal of the photoconductive photodetector 310 through the capacitors C1 and C2. A current generated in the photoconductive photodetector 310 flows through choke coils L1 and L2.

Figure 7:
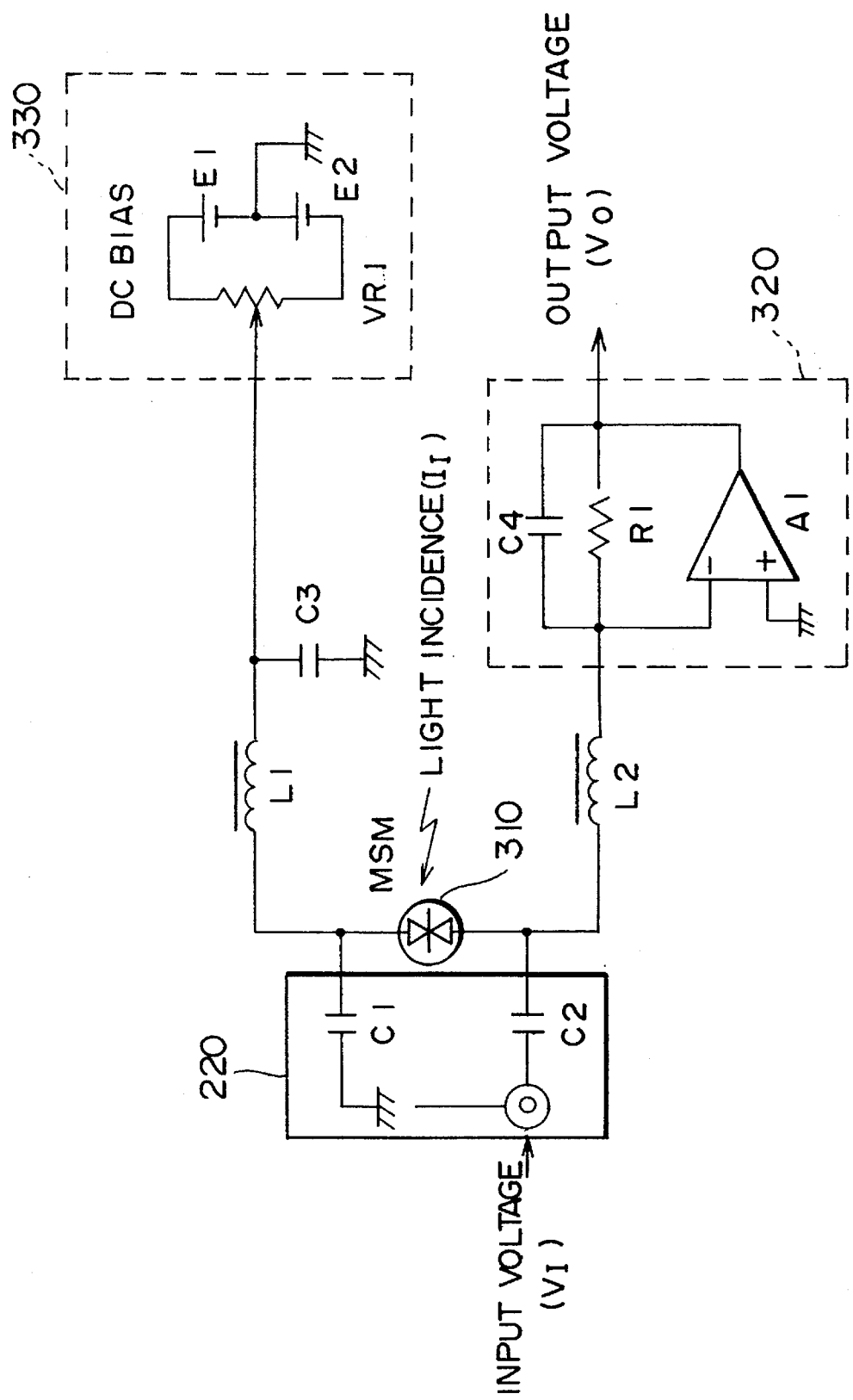
FIG. 7 is a circuit diagram showing the second arrangement of the main part of the synchronous signal detection apparatus according to the present invention.

By modifying the method of applying a voltage signal in the circuit arrangement of FIG. 6, a circuit arrangement shown in FIG. 7 (i.e., a voltage application unit 220 is employed), or a circuit arrangement shown in FIG. 8 (i.e., a voltage application unit 230 is employed) can be used. With these arrangements, a DC voltage output can be obtained in accordance with a phase difference similar to the circuit arrangement shown in FIG. 6.

Figure 9:
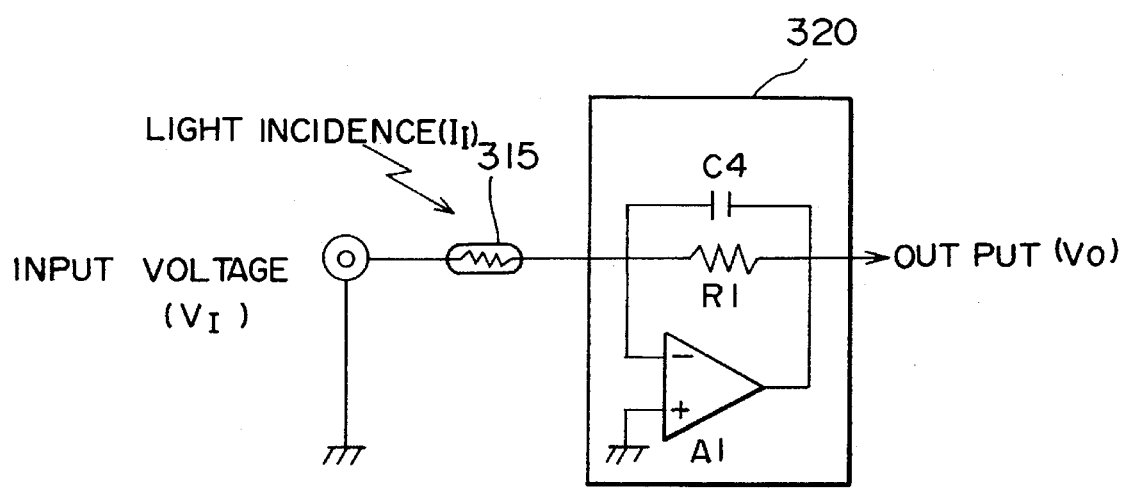
FIG. 9 is a circuit diagram showing the fourth arrangement of the main part of the synchronous signal detection apparatus according to the present invention.

The above circuit arrangements are suitable when the photoconductive photodetector 310 has good transient response as in the MSM using GaAs. In contrast, when a photoconductive photodetector 315 whose transient response is poor due to a photodetecting material of CdS, PbS, or the like is used, a circuit arrangement as shown in FIG. 9 is suitable. This arrangement can be obtained without a voltage application unit.

The operation of the main part of the present invention will be described below with reference to a voltage ($V_I$) output from the voltage application unit 200 and a light beam to be measured ($I_I$) which are to be input to the photoconductive photodetector 310. (Voltage Signal $V_I$ and Optical Signal $I_I$ as Rectangular Wave Signals Having the Same Period)

Figure 10:
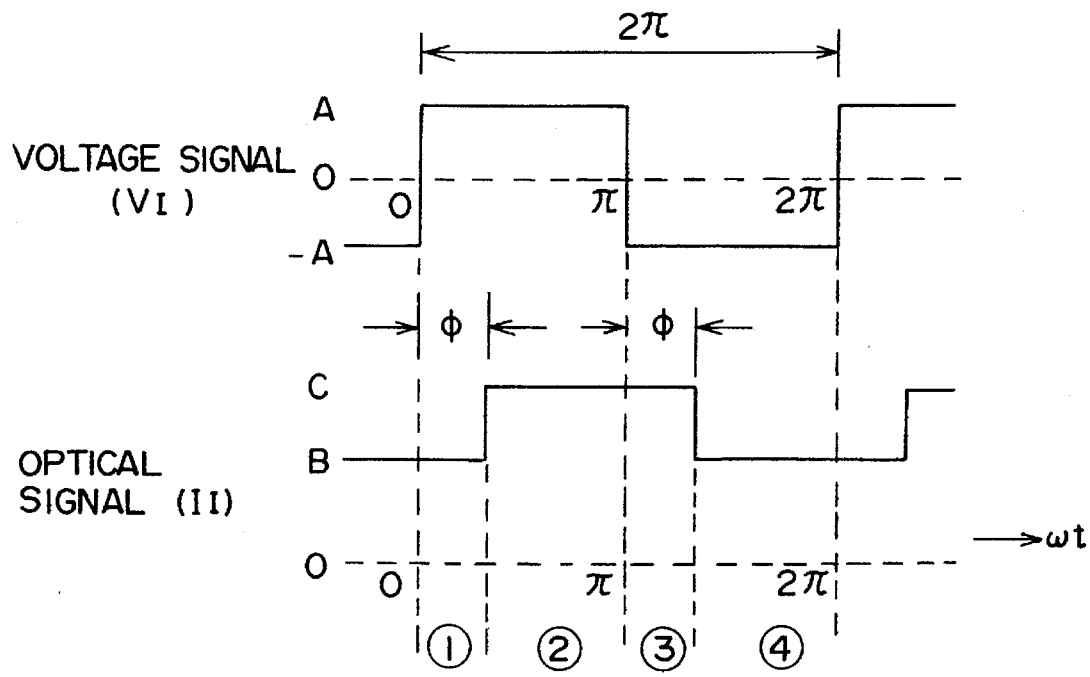
FIGS. 10 and 11 are views for explaining the operation (rectangular wave input operation) of the main part of the synchronous signal detection apparatus according to the present invention.
Figure 11:
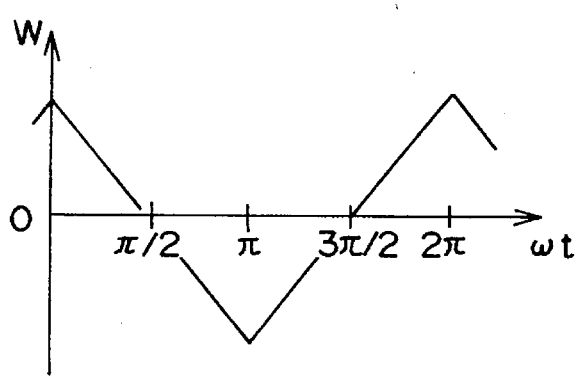

FIGS. 10 and 11 are graphs for explaining this case. FIG. 10 shows the voltage signal ($V_I$) and the optical signal ($I_I$) which are input signals to the photoconductive photodetector 310 in this case. As shown in FIGS. 10 and 11, the voltage signal $V_I$ and the optical signal $I_I$ are periodic. When a phase different $\phi < \pi$ within one period ($0 < \omega t < 2\pi$), $$V_I = \begin{cases} A (0 < \omega t < \pi) \\ -A (\pi < \omega t < 2\pi) \end{cases} \quad (1)$$

$$I_I = \begin{cases} B (0 < \omega t < \phi, \pi + \phi < \omega t < 2\pi) \\ C (\phi < \omega t < \pi + \phi) \end{cases} \quad (2)$$

where

A: the amplitude of a voltage signal

B: the intensity 1 of an incident light beam

C: the intensity 2 of an incident light beam.

The photoconductive photodetector 310 generates a current in accordance with the product of the voltage signal $V_I$ and the optical signal $I_I$ at each time. Assuming That one period is divided into intervals such as ① to ④ as shown in FIG. 10, voltage values W1 to W4 output from the current-to-voltage conversion unit 320 at the respective intervals are $$W1 = K1 \cdot K2 \cdot K3 \cdot A \cdot B \quad (3)$$

$$W2 = K1 \cdot K2 \cdot K3 \cdot A \cdot C \quad (4)$$

$$W3 = -K1 \cdot K2 \cdot K3 \cdot A \cdot C \quad (5)$$

$$W4 = -K1 \cdot K2 \cdot K3 \cdot A \cdot B \quad (6)$$

where

K1: the proportional constant of an output current with respect to the voltage applied to the photoconductive photodetector K2: the proportional constant of an output current with respect to the intensity of an input light beam to the photoconductive photodetector K3: the conversion constant of the current-to-voltage conversion unit.

Therefore, a voltage value $V_O$ output from the current-to-voltage conversion unit 320 is $$V_O = (W1 \cdot \phi + W2 \cdot (\pi - \phi) + W3 \cdot \phi + W4 \cdot (\pi - \phi))/2\pi = K1 \cdot K2 \cdot K3 \cdot A(B-C)(\tfrac{1}{2} - \phi/\pi) \quad (7)$$

In the same manner, when the phase difference is $\pi < \phi < 2\pi$, $$V_O = K1 \cdot K2 \cdot K3 \cdot A(B-C)(\phi/\pi - \tfrac{3}{2}). \quad (8)$$

That is, the voltage value $V_O$ changes like a polygonal line with respect to the phase difference $\phi$. In addition, when the phase difference $\phi = 0$, the voltage value $V_O$ has the maximum value; when the phase difference $\phi = \pi/2$, or $\phi = 3\pi/2$, the voltage value $V_O$ is 0; and when the phase difference $\phi = \pi$, the voltage value $V_O$ has the minimum value (see FIG. 11). Therefore, the phase difference $\phi$ is changed by operating the phase adjustment unit 100 to measure the maximum value of the voltage value $V_O$, thereby obtaining the amplitude (B−C) of the light beam to be measured. (Voltage Signal $V_I$ and Optical Signal $I_I$ as Sine Wave Signals Having the Same Period)

Figure 12:
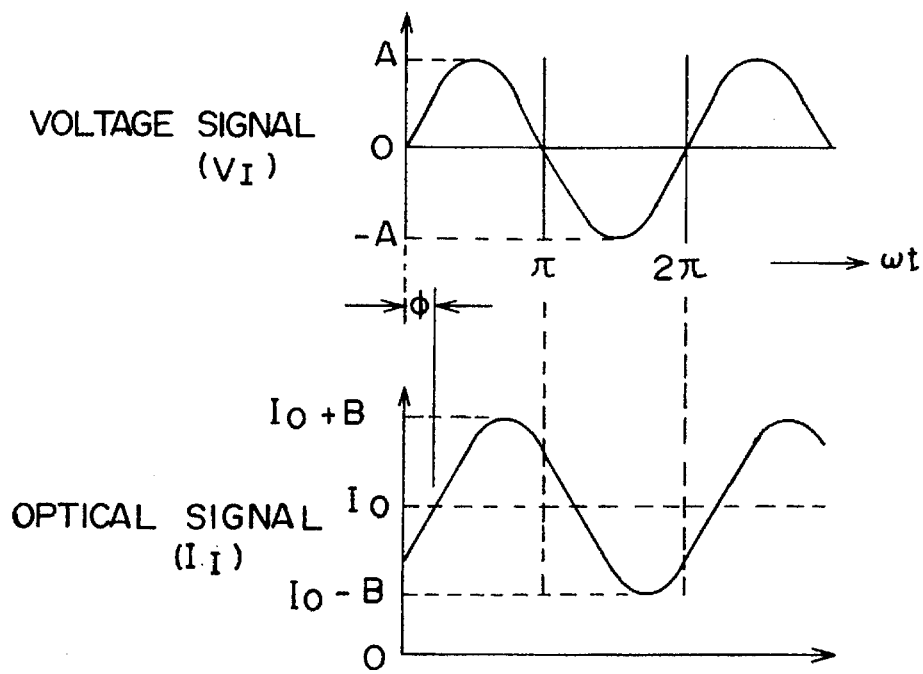
FIGS. 12 and 13 are views for explaining the operation (sine wave input operation) of the main part of the synchronous signal detection apparatus according to the present invention.
Figure 13:
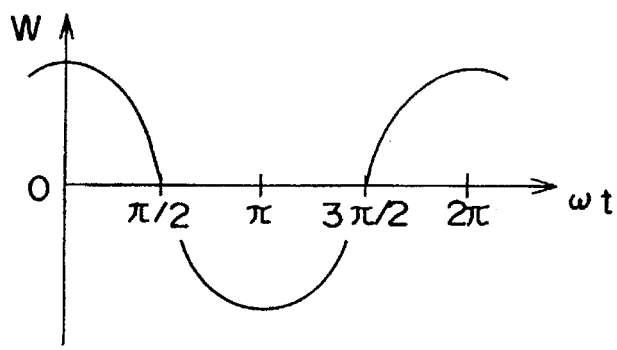

FIGS. 12 and 13 are graphs for explaining this case. FIG. 12 shows the voltage signal ($V_I$) and the optical signal ($I_I$) which are input signals to the photoconductive photodetector 310 in this case. As shown in FIGS. 12 and 13, the voltage signal $V_I$ and the optical signal $I_I$ are periodic. When a phase different $\phi<\pi$ within one period ($0<\omega\tau<2\pi$), $$V_I = A \cdot \sin \omega\tau \qquad (9)$$

$$I_I = B \cdot \sin(\omega\tau - \phi) + IO \qquad (10)$$

where $\omega$: the angular frequency.

Similar to the above example, the photoconductive photodetector 310 generates a current in accordance with the product of the voltage signal $V_I$ and the optical signal $I_I$ at each time. An current value i at each time is represented by $$i = K1 \cdot K2 \cdot V_I I_I = K1 \cdot K2 \cdot A(B \sin \omega\tau \cdot \sin(\omega\tau - \phi) + I_o \sin \omega\tau) \qquad (11)$$

Therefore, a voltage value $V_O$ output from the current-to-voltage conversion unit 320 is $$\begin{aligned} V_o &= K3 \frac{1}{2\pi} \int_0^{2\pi} i d\theta(\theta : \omega t) \\ &= \frac{1}{2} K1 \cdot K2 \cdot K3 \cdot A \cdot B \cdot \cos\phi \\ &= V_M \cdot \cos\phi \end{aligned} \qquad (12)$$

That is, similar to the above example, the voltage value $V_O$ changes like a cosine curve with respect to the phase difference $\phi$. In addition, when the phase difference $\phi=0$, the voltage value $V_O$ has the maximum value; when the phase difference $\phi=\pi/2$, or $\phi=3\pi/2$, the voltage value $V_O$ is 0; and when the phase difference $\phi=\pi$, the voltage value $V_O$ has the minimum value (see FIG. 13). Therefore, the phase difference $\phi$ is changed by operating the phase adjustment unit 100 to measure the maximum value of the voltage value $V_O$, thereby obtaining the amplitude $I_O$ of the light beam to be measured.

Figure 14:
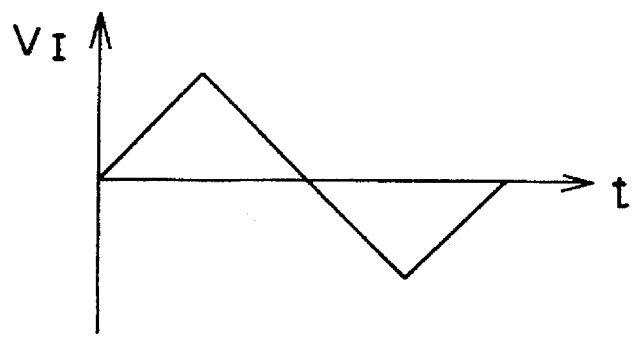
FIGS. 14 and 15 are graphs for explaining an applied voltage signal.
Figure 15:
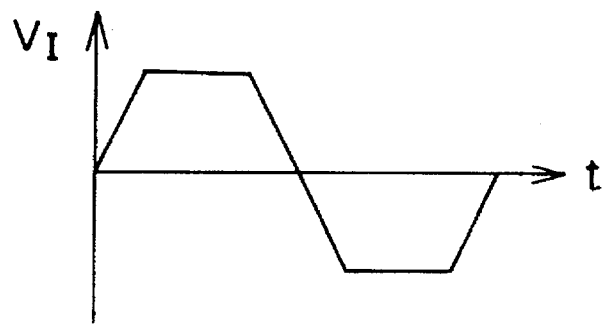

The two typical cases have been described. The waveforms of the voltage signal and the optical signal are not limited to the above rectangular and sine waves. When a wave is periodic and has a time average value of almost zero and an amplitude represented as an even function of the time when the origin is set at time of a middle point between two adjacent times in which the amplitude becomes zero, the same measurement operation as in the above cases can be executed by using this wave. For example, a triangular wave shown in FIG. 14, or a trapezoidal wave shown in FIG. 15 can be used. Further, the voltage signal and the optical signal do not necessarily have the same waveform. They employ waves which have the same period and whose time average is almost 0 and amplitude is an even function of the time using, as the origin, time at a middle point between two adjacent times whose amplitudes are 0.

The embodiments of the synchronous signal detection apparatus of the present invention which has the above main part will be described below.

(First Embodiment)

Figure 16:
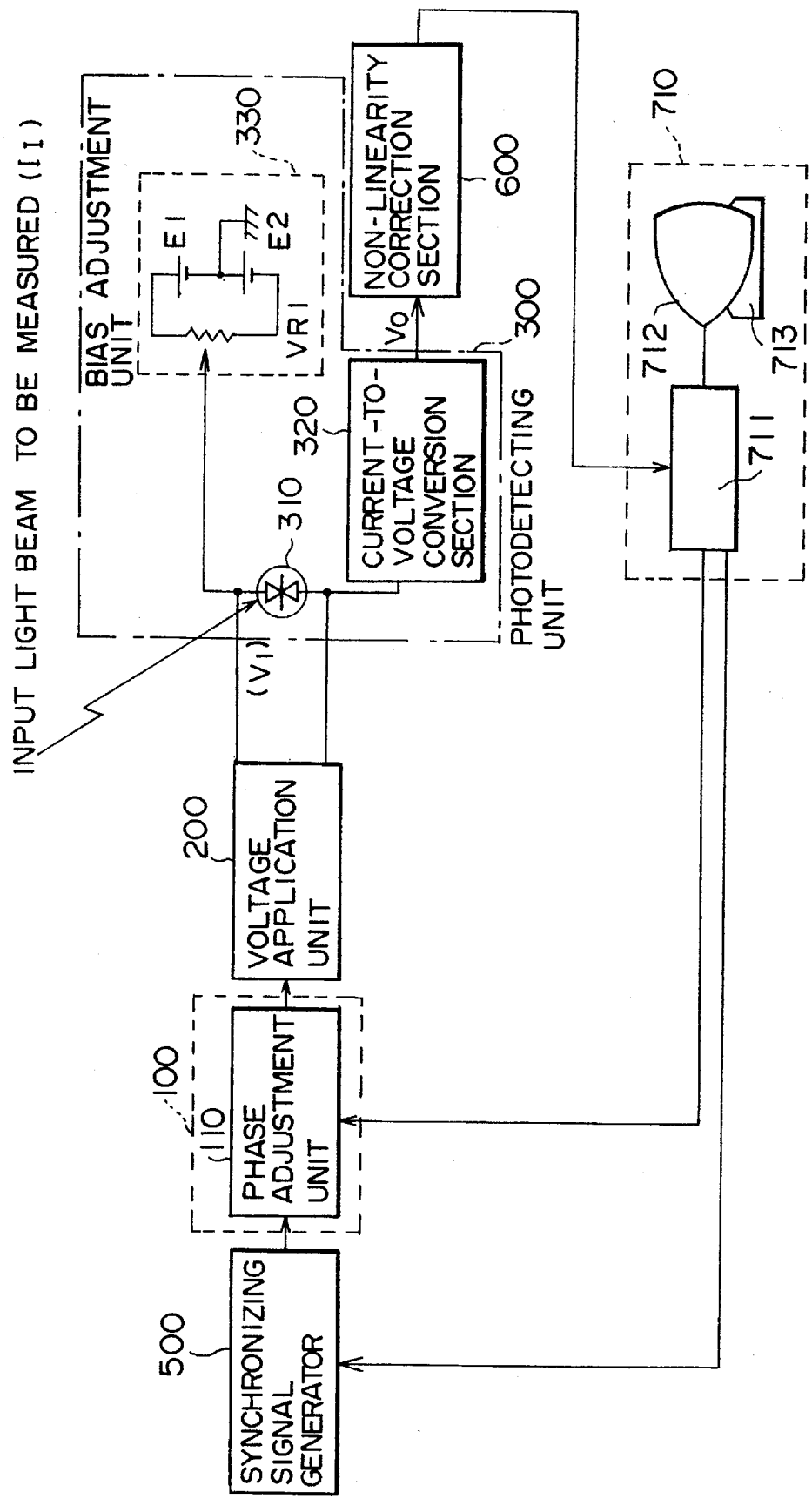
FIG. 16 is a block diagram showing the arrangement of a synchronous signal detection apparatus according to the first embodiment of the present invention.

FIG. 16 is a block diagram showing the arrangement of a synchronous signal detection apparatus according To the first embodiment of the present invention. The apparatus of this embodiment is suitable when the frequency distribution of the intensity of a light beam to be measured is not known, e.g., the noise spectrum of a leaser beam is to be measured.

As shown in FIG. 16, the apparatus of this embodiment comprises (a) a signal generator 500, (b) a phase shifter 110, (c) a voltage application unit 200, (d) a photodetecting unit 300, (e) a non-linearity correction unit 600, and (f) a processor 710. The signal generator 500 generates a sine wave signal, as a synchronizing signal, whose frequency changes in accordance with an external designation. The phase shifter 110 receives the synchronizing signal output from the signal generator 500 and adjusts the phase of the output signal by changing a time between the signal input and the signal output. The voltage application unit 200 receives an electrical signal output from the phase shifter 110 and outputs a voltage signal ($V_J$) at a low output impedance. The photodetecting unit 300 receives the voltage signal ($V_J$) output from the voltage application unit 200 and also receives a light beam to be measured to output an output voltage signal ($V_O$) corresponding to the intensity of a predetermined frequency component of the light beam to be measured, and a phase difference between the predetermined frequency component of the light beam to be measured and the voltage signal ($V_J$). The non-linearity correction unit 600 corrects the non-linearity of the output voltage signal ($V_O$) from the photodetecting unit 300. The processor 710 designates the frequency of a generation signal to the signal generator 500, and also designates an adjustment phase amount to the phase shifter 110. The processor 710 acquires and processes signals output from the non-linearity correction unit 600.

The circuit constant and the like of the non-linearity correction unit 600 are adjusted to correct the non-linearity of the voltage output ($V_O$) with respect to an amount of light beam, measured in advance, which is received by the photodetecting unit 300 upon application of a constant voltage.

The processor 710 comprises ① an input operation unit 713, ② an arithmetic unit 711, and ③ a display unit 712. Measurement conditions are manually input at the input operation unit 713. The arithmetic unit 711 designates the frequency of a generation signal to the signal generator 500, and also designates a phase adjustment amount to the phase shifter 110 on the basis of the measurement conditions input from the input operation unit 713. The arithmetic unit 711 acquires and processes signals output from the non-linearity correction unit 600. The display unit 712 displays the arithmetic results of the arithmetic unit 711.

The apparatus of this embodiment synchronously measures the intensity of each frequency component included in the light beam to be measured in the following manner. In the following description, for the sake of simplicity, a multiplication factor in the non-linearity correction unit 600 is assumed to be "1".

First, an operator inputs the range of frequencies to be measured, a step value of the frequencies to be measured, a step value of the phase adjustment amount, and the like from the input operation unit 713. The arithmetic unit 711 which receives information of these measurement conditions informs the signal generator 500 of the initial frequency of a generation signal, and designates an initial phase adjustment amount to the phase shifter 110. In this state, when the photoconductive photodetector 310 receives a light beam to be measured, the photodetecting unit 300 outputs an almost DC voltage signal through the non-linearity correction unit 600. The arithmetic unit 711 acquires and stores the voltage value of this voltage signal.

Next, the arithmetic unit 711 calculates a step value of the phase adjustment amount in accordance with the generation frequency informed to the signal generator 500. The arithmetic unit 711 designates a change in phase of the output signal by this step value to the phase shifter 110. In this state, the photoconductive photodetector 310 receives a light beam to be measured, and the arithmetic unit 711 acquires and stores the voltage value of a signal output from the non-linearity correction unit 600. Subsequently, the phase of a signal output from the phase shifter 110 is changed by the step value of the phase adjustment amount each time, and the arithmetic unit 711 acquires and stores the voltage value of a signal output from the non-linearity correction unit 600 each time.

When the accumulation of changes in phases of the signals output from the phase shifter 110 reaches $2\pi$, the arithmetic unit 711 processes the data of the stored voltage values to calculate the maximum voltage value. The arithmetic unit 711 recognizes this maximum voltage value as an amount corresponding to the intensity of the frequency component of the light beam to be measured at the generation frequency informed to the signal generator 500.

Then, the arithmetic unit 711 designates a change in generation frequency which corresponds to the step value of a frequency to be measured to the signal generator 500, and also designates the initial phase adjustment amount to the phase shifter 110. Thereafter, the measurement operation is performed in the same manner as described above. The arithmetic unit 711 stores the intensity of a frequency component of the light beam to be measured at the generation frequency informed to the signal generator 500. Subsequently, the generation frequency of the signal generator 500 is changed by the step value of the generation frequency each time, and stores an amount corresponding to the intensity of a frequency component of the light beam to be measured at each generation frequency informed to the signal generator 500.

When the measurement operation of the amounts corresponding to the intensities of the frequency components is finished in all the designated range of frequencies to be measured, the arithmetic unit 711 calculates the intensities of the frequency components. Then, the measurement results are displayed on the display unit 712 and informed to the operator. Note that the display on the display unit 712 may be performed every time the measurement operation of the intensity of each frequency component is finished.

In this embodiment, assuming that the frequency distribution of the intensity of a light beam to be measured is not known at all, the synchronizing frequency is continuously changed. If the frequencies of a light beam to be measured are known, only synchronizing signals related to these frequencies are generated by the signal generator 500. Moreover, if a synchronous measurement operation is performed at a fixed frequency, the generation frequency of the signal generator 500 need not be variable. Therefore, the arithmetic unit 711 need not perform frequency control.

(Second Embodiment)

Figure 17:
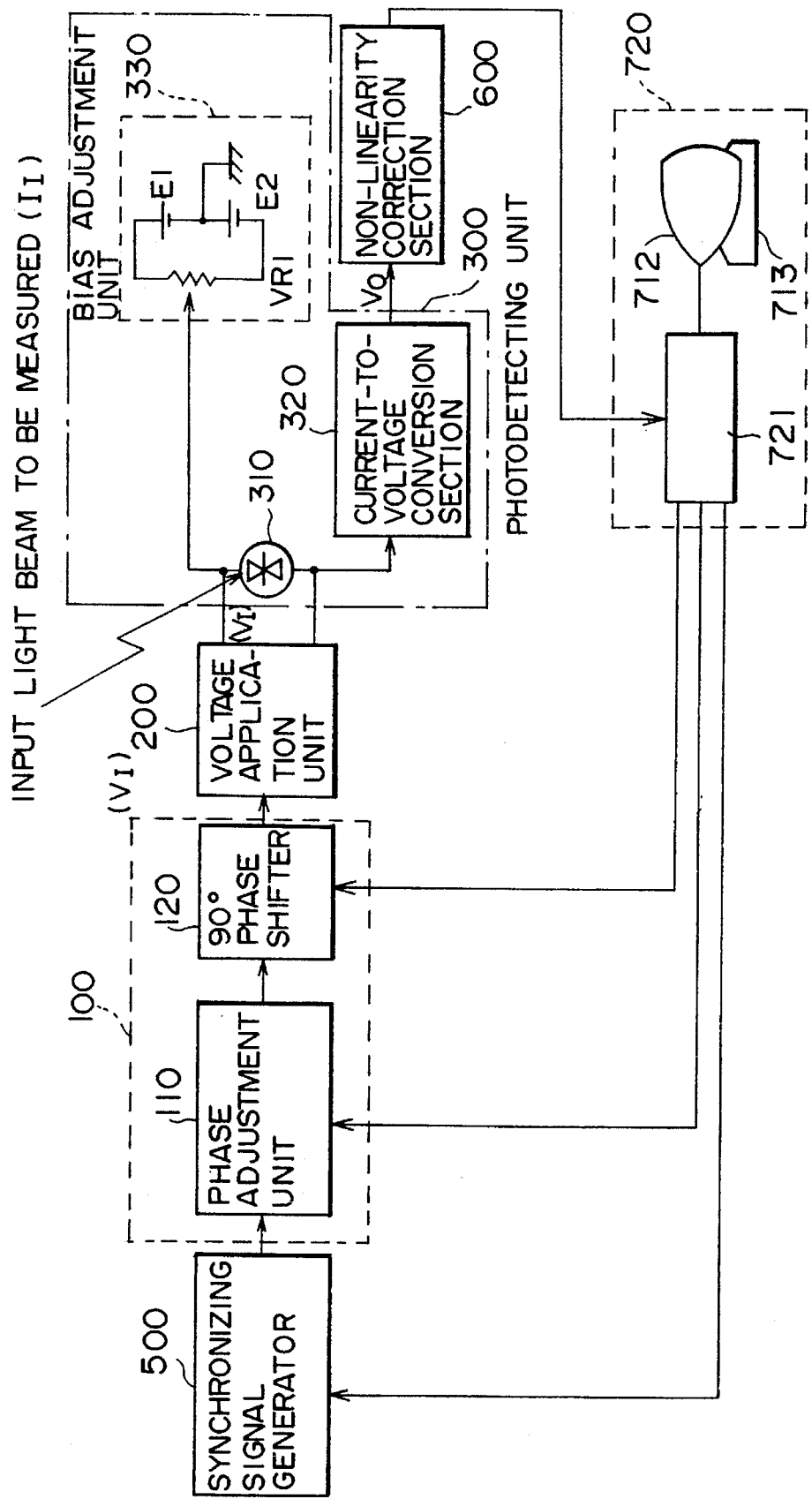
FIG. 17 is a block diagram showing the arrangement of a synchronous signal detection apparatus according to the second embodiment of the present invention.

FIG. 17 is a block diagram showing the arrangement of a synchronous signal detection apparatus according to the second embodiment of the present invention. Similar to the first embodiment, the apparatus of this embodiment is suitable when the frequency distribution of the intensity of a light beam to be measured is not known, e.g., the noise spectrum of a leaser beam is to be measured. As shown in FIG. 17, the apparatus of this embodiment has the same arrangement as that of the first embodiment except that, in addition to a phase shifter 110, a 90° phase shifter 120 capable of externally switching a change in phase by 0°/90° is arranged between the phase shifter 110 and a voltage application unit 200 as a phase adjustment unit, and an arithmetic unit 721 has a function of controlling switching of the 90° phase shifter 120 in addition to the function of the arithmetic unit 721.

The apparatus of this embodiment synchronously measures the intensity of each frequency component included in the light beam to be measured in the following manner. In the following description, for the sake of simplicity, a multiplication factor in a non-linearity correction unit 600 is assumed to be "1" similar to the first embodiment.

First, an operator inputs the range of frequencies to be measured, a step value of the frequencies to be measured, the step value of a phase adjustment amount, and the like from an input operation unit 713. The arithmetic unit 721 which receives information of these measurement conditions designates the initial frequency of a generation signal to a signal generator 500, and designates the phase adjustment amount to the phase shifter 110. In addition, the arithmetic unit 721 designates a change in phase by 0° to the 90° phase shifter 120. At this time, regardless of phase switching by the 90° phase shifter 120, the phase adjustment amount of the phase shifter 110 is set such that the level of a normal output from a current-to-voltage conversion unit 320 is significantly higher than the noise level. In this state, when a photoconductive photodetector 310 receives a light beam to be measured, a photodetecting unit 300 outputs an almost DC voltage signal through the non-linearity correction unit 600. The arithmetic unit 721 acquires and stores a voltage value ($V_{OC}$) of this voltage signal. This voltage value ($V_{OC}$) is represented in accordance with equation (12)

$$V_{OC} = V_M \cos \phi \tag{13}$$

Then, the arithmetic unit 721 designates a change in phase by 90° to the 90° phase shifter 120, and acquires and stores a voltage value ($V_{OS}$) of a voltage signal output from the non-linearity correction unit 600 in this state. This voltage value ($V_{OS}$) is also represented by equation (12)

$$V_{OS} = V_M \cos (\phi + 90°) = -V_M \sin \phi \tag{14}$$

From the values $V_{OC}$ and $V_{OS}$, the arithmetic unit 721 operates $$V_M = (V_{OC}^2 + V_{OS}^2)^{1/2} \tag{15}$$

to obtain a value $V_M$ as a value which reflects the intensity of the frequency component of the light beam to be measured. This value $V_M$ is stored as an amount corresponding to the intensity of the frequency component of the light beam to be measured.

At the same time, from the values $V_{OC}$ and $V_{OS}$, the arithmetic unit 721 operates $$\phi = -\tan^{-1}(V_{OS}/V_{OC}) \tag{16}$$

to obtain a phase difference $\phi$ as a value which reflects the phase of the frequency component of the light beam to be measured. A difference between this value $\phi$ and the phase adjustment amount designated to the phase shifter 110 is stored as a phase value of the frequency component of the light beam to be measured.

Then, the arithmetic unit 721 designates a change in the generation frequency which corresponds to the step value of the frequency to be measured to the signal generator 500.

Thereafter, the measurement operation is performed in the same manner as described above. The arithmetic unit 721 stores an amount corresponding to the intensity of a frequency component of the light beam to be measured at the generation frequency informed to the signal generator 500. Subsequently, the generation frequency of the signal generator 500 is changed by the step value of the generation frequency each time, and stores a phase value and an amount corresponding to the intensity of a frequency component of the light beam to be measured at each generation frequency informed to the signal generator 500.

When the measurement operation of the intensities of the frequency components is finished in all the designated range of frequencies to be measured the arithmetic unit 721 calculates the intensities of the frequency components. Then, the measurement results are displayed on a display unit 712 and informed to the operator. Note that the display on the display unit 712 may be performed every time the measurement operation of the intensity of each frequency component and the phase value is finished.

In this embodiment, similar to the first embodiment, assuming that the frequency distribution of the intensity of a light beam to be measured is not known at all, the synchronizing frequency continuously changed. If the frequencies of a light beam to be measured are known, only synchronizing signals related to these frequencies are generated by the signal generator 500. Moreover, if a synchronous measurement operation is performed at a fixed frequency, the generation frequency of the signal generator 500 need not be variable. Therefore, the arithmetic unit 711 need not perform frequency control.

In this embodiment, the phase adjustment unit 100 is constituted by the phase shifter 110 and the 90° phase shifter 120. Alternatively, the phase adjustment unit 100 can be constituted by only the 90° phase shifter 120. However, when the value $V_{OC}$ or $V_{OS}$ is occasionally "0 [IV]", the measurement precision of the value $\phi$ decreases.

(Third Embodiment)

Figure 18:
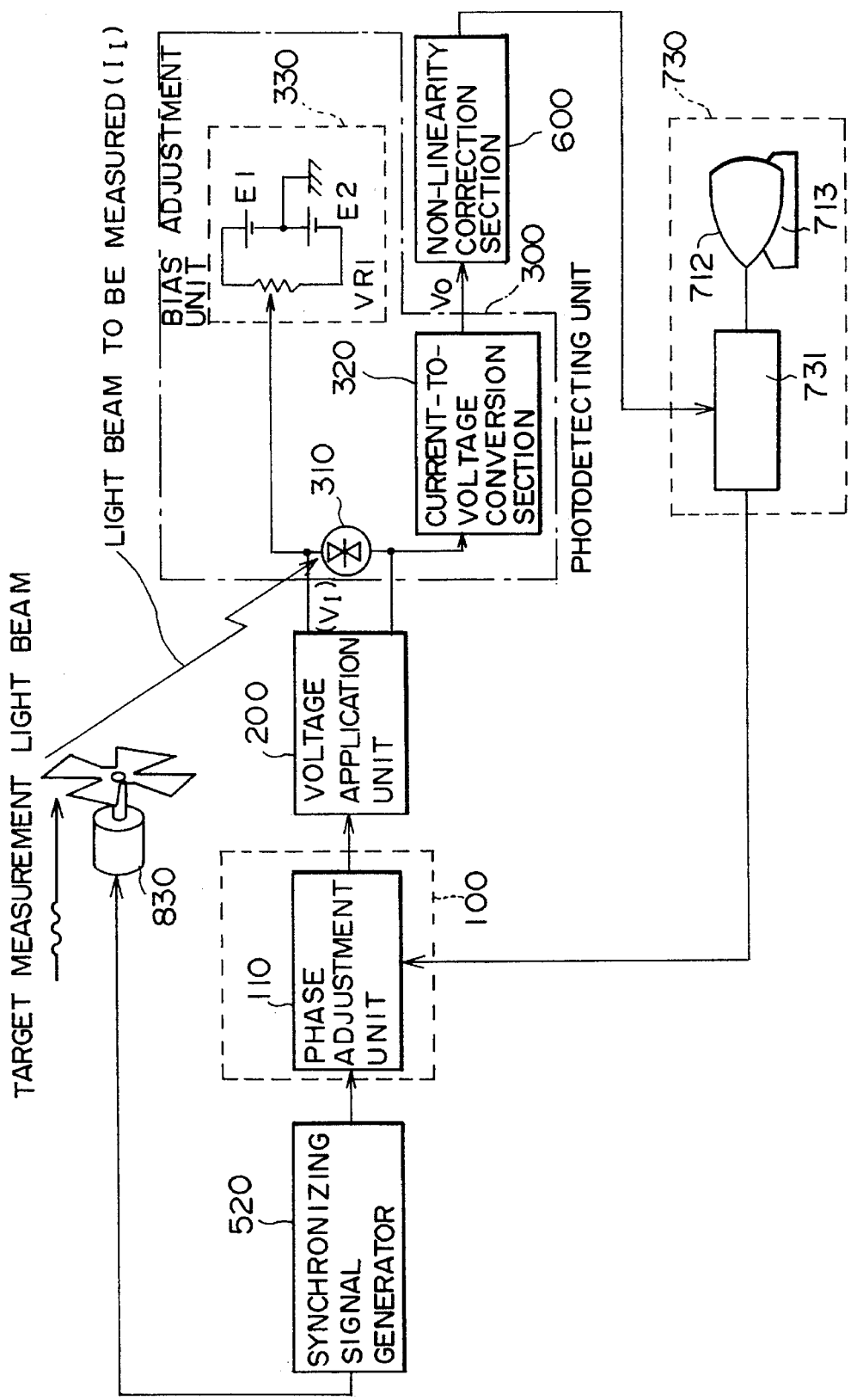
FIG. 18 is a block diagram showing the arrangement of a synchronous signal detection apparatus according to the third embodiment of the present invention.

FIG. 18 is a block diagram showing the arrangement of a synchronous signal detection apparatus according to the third embodiment of the present invention. The apparatus of this embodiment is suitable when a light beam to be measured (to be referred to as a target measurement light beam) is an almost DC light beam, and its intensity is not known. As shown in FIG. 18, the apparatus of this embodiment comprises (a) a signal generator 520 for generating a synchronizing signal, (b) a phase shifter 110, (c) a voltage application unit 200, (d) a photodetecting unit 300, (e) a non-linearity correction unit 600, (f) a processor 730, and (g) a modulator 830. The phase shifter 110 receives the synchronizing signal output from the signal generator 520 and adjusts the phase of the output signal by changing a time between the signal input and the signal output. The voltage application unit 200 receives an electrical signal output from the phase shifter 110 and outputs a voltage signal ($V_I$) at a low output impedance. The photodetecting unit 300 receives the voltage signal ($V_I$) output from the voltage application unit 200 and also receives a light beam to be measured to output an output voltage signal ($V_O$) corresponding to the intensity of a predetermined frequency component of the light beam to be measured, and a phase difference between the predetermined frequency component of the light beam to be measured and the voltage signal ($V_I$). The non-linearity correction unit 600 corrects the non-linearity of the output voltage signal ($V_O$) from the photodetecting unit 300. The processor 730 designates the adjustment phase amount to the phase shifter 110. The processor 730 acquires and processes signals output from the non-linearity correction unit 600. The modulator 830 modulates the light beam objected to measurement at a modulation degree of 0% to 100% in synchronism with the synchronizing signal output from the signal generator 520 to make the modulated light beam as a light beam to be measured.

The signal generator 520 generates a periodic signal represented by equation (1) as a synchronizing signal. The modulator 830 switches, every $\pi/\omega$ (sec), a state in which the direction of a target measurement light beam is changed toward the photodetecting unit 300 and no light beam is made to pass through the photodetecting unit 300, and a state in which the direction of a target measurement light beam is changed toward the photodetecting unit 300 and 100% of the light beam is made to pass through The photodetecting unit 300. It is different from the processor 710 of the first embodiment in that an arithmetic unit 731 of the processor 730 does not have a function of controlling the frequency of a synchronizing signal.

First, an operator input the step value of a phase adjustment amount, and the like from an input operation unit 713. The arithmetic unit 731 which receives information of these measurement conditions designates an initial phase adjustment amount to the phase shifter 110. In this state, when a photoconductive photodetector 310 receives a light beam to be measured, the photodetecting unit 300 outputs an almost DC voltage signal through the non-linearity correction unit 600. The arithmetic unit 731 acquires and stores the voltage value of this voltage signal.

Next, the arithmetic unit 731 calculates the step value of the phase adjustment amount in accordance with the frequency of the synchronizing signal. The arithmetic unit 731 designates a change in phase of the output signal corresponding to this step value to the phase shifter 110. At the same time, the modulator 830 is started to operate. In this state, the photoconductive photodetector 310 receives a light beam to be measured, and the arithmetic unit 731 acquires and stores the voltage value of a signal output from the non-linearity correction unit 600. Subsequently, the phase of a signal output from the phase shifter 110 is changed by the step value of the phase adjustment amount each time, and the arithmetic unit 731 acquires and stores the voltage value of a signal output from the non-linearity correction unit 600 each time.

When the accumulation of the changes in phases of the signals output from the phase shifter 110 reaches $2\pi$, the arithmetic unit 731 processes the data of the stored voltage values to calculate the maximum voltage value. The arithmetic unit 731 recognizes this maximum voltage value as an amount corresponding to the intensity of the light beam objected to measurement. In this manner, when the measurement operation of amounts corresponding to the intensities of the light beam objected to measurement is finished, the arithmetic unit 731 calculates the intensity of the light beam objected to measurement. Then, the measurement results are displayed on a display unit 712 and informed to the operator.

The apparatus of this embodiment can be modified like the modification of the first embodiment to the second embodiment. In this case, the operation of almost continuously controlling a phase difference by the phase shifter 110 is not required, and the intensity of a target measurement light beam can be measured by two measurement steps.

Note that the position of the modulator 830 is set merely between a generation source of a target measurement light beam and the photodetecting unit 300, and a distance from the photodetecting unit 300 need not be taken into consideration. However, a position where entrance of a noise component such as a background light beam to the photodetecting unit 300 can be minimized must be selected.

When a target measurement light beam is generated by irradiation of an excitation light beam with respect to an object to be measured, and the intensity of the light beam objected to measurement is almost linear with respect to the irradiation intensity of the excitation light beam, the modulator 830 can be set between the light source of an excitation light beam and the object to be measured. In this case, the amplitude of the intensity of a target measurement light beam can be measured in the same manner as in this embodiment.

(Fourth Embodiment)

Figure 20:
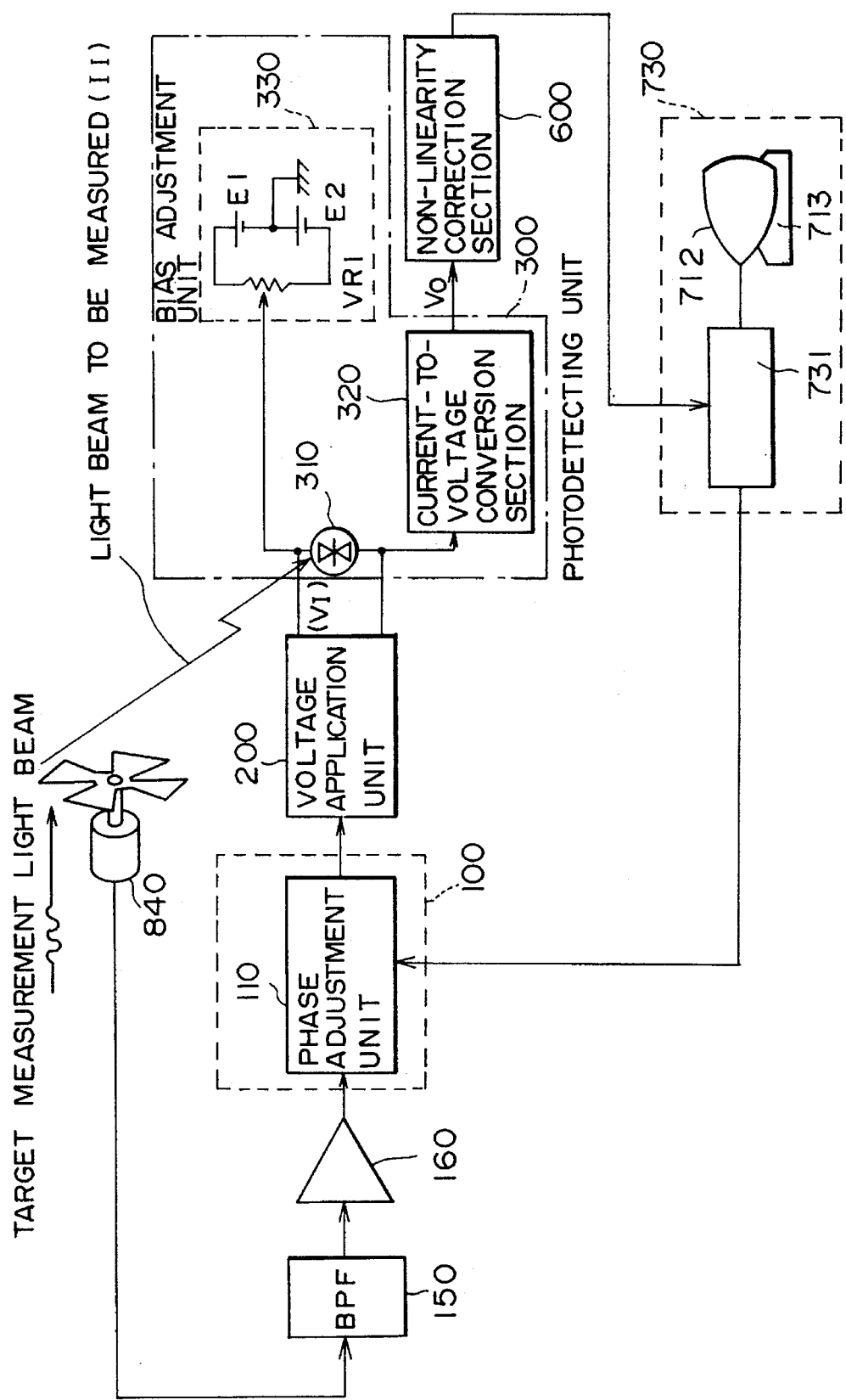
FIG. 20 is a block diagram snowing the arrangement of a synchronous signal detection apparatus according to the fourth embodiment of the present invention.

FIG. 20 is a block diagram showing the arrangement of a synchronous signal detection apparatus according to the fourth embodiment of the present invention. Similar to the third embodiment, the apparatus of this embodiment is suitable when a target measurement light beam is an almost DC light beam, and its intensity is not known. As shown in FIG. 20, the apparatus of this embodiment comprises (a) a modulator 840, (b) a bandpass filter 150, (c) an amplifier 160, (d) a phase shifter 100 (e) a voltage application unit 200, (f) a photodetecting unit 300, (9) a non-linearity correction unit 600, and (h) a processor 730. The modulator 840 modulates a target measurement light beam at a modulation degree of 0% to 100% so as to have a predetermined frequency, thereby making the modulated light beam as a light beam to be measured. In addition, the modulator 840 outputs a synchronizing signal having this predetermined frequency. The bandpass filter 150 receives the synchronizing signal output from the modulator 840, and selects signals having frequencies close to the predetermined frequency to transmit the selected signals. The amplifier 160 amplifies the synchronizing signal passing through the bandpass filter 150. The phase shifter 110 receives the synchronizing signal output from the amplifier 160 and adjusts the phase of the output signal by changing a time between the signal input and the signal output. The voltage application unit 200 receives an electrical signal output from the phase shifter 110 and outputs a voltage signal ($V_I$) at a low output impedance. The photodetecting unit 300 receives the voltage signal ($V_I$) output from the voltage application unit 200 and also receives a light beam to be measured to output an output voltage signal ($V_O$) corresponding to the intensity of a predetermined frequency component of the light beam to be measured, and a phase difference between the predetermined frequency component of the light beam to be measured and the voltage signal ($V_I$). The non-linearity correction unit 600 corrects the non-linearity of the output voltage signal ($V_O$) from the photodetecting unit 300. The processor 730 designates a phase adjustment amount to the phase shifter 110. The processor 730 acquires and processes signals output from the non-linearity correction unit 600.

Figure 21:
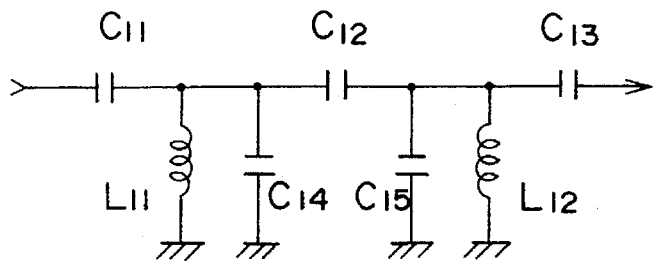
FIGS. 21, 22, and 23 are circuit diagrams showing circuit arrangements of a bandpass filter according to the fourth embodiment of the present invention.
Figure 22:
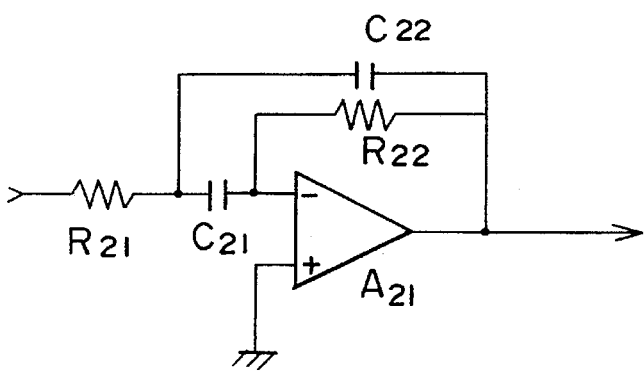
Figure 23:
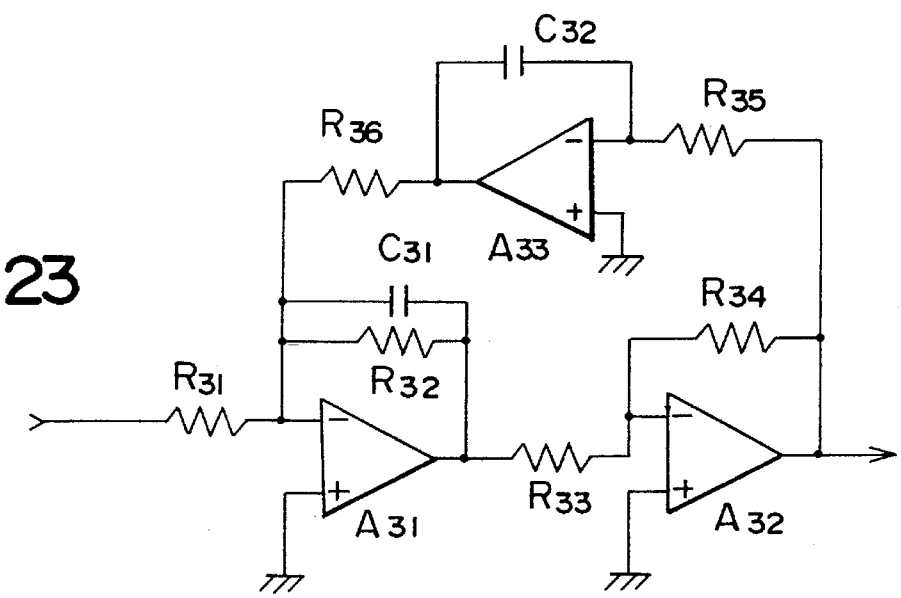

FIGS. 21, 22, and 23 are circuit diagrams for explaining circuit arrangements of the bandpass filter 150 which can be used in this embodiment. This embodiment employs a passive bandpass filter in FIG. 21 of the circuit arrangements illustrated in FIGS. 21 to 23.

The modulator 840 switches, every π/ω (sec), a state in which the direction of a target measurement light beam is changed toward the photodetecting unit 300 and no light beam is made to pass through the photodetecting unit 300, and a state in which the direction of a target measurement light beam is changed toward the photodetecting unit 300 and 100% of the light beam is made to pass through the photodetecting unit 300.

First, an operator inputs the step value of a phase adjustment amount, and the like from an input operation unit 713. An arithmetic unit 731 which receives information of these measurement conditions designates an initial phase adjustment amount to the phase shifter 110. At the same time, the modulator 840 is started to operate. A synchronizing signal output from the modulator 840 is input to the phase shifter 110 through the bandpass filter 150 and the amplifier 160. Thereafter, the intensity of a target measurement light beam is measured in the same manner as in the third embodiment.

That is, when a photoconductive photodetector 310 receives a light beam to be measured in this state, the photodetecting unit 300 outputs an almost DC voltage signal through the non-linearity correction unit 600. The arithmetic unit 731 acquires and stores the voltage value of this voltage signal.

Next, the arithmetic unit 731 calculates the step value of the phase adjustment amount in accordance with the frequency of the synchronizing signal. The arithmetic unit 731 designates a change in phase of the output signal corresponding to this step value to the phase shifter 110. In this state, the photoconductive photodetector 310 receives a light beam to be measured, and the arithmetic unit 731 acquires and stores the voltage value of a signal output from the non-linearity correction unit 600. Subsequently, the phase of a signal output from the phase shifter 110 is changed by the step value of the phase adjustment amount each time, and the arithmetic unit 731 acquires and stores the voltage value of a signal output from the non-linearity correction unit 600 each time.

When the accumulation of the changes in phases of the signals output from the phase shifter 110 reaches 2π, the arithmetic unit 731 processes the data of the stored voltage values to calculate the maximum voltage value. The arithmetic unit 731 recognizes this maximum voltage value as an amount corresponding to the intensity of the light beam objected to measurement. In this manner, when the measurement operation of amounts corresponding to the intensities of the light beam objected to measurement is finished, the arithmetic unit 731 calculates the intensity of the light beam objected to measurement. Then, the measurement results are displayed on a display unit 712 and informed to the operator.

The apparatus of this embodiment can be modified like the modification of the first embodiment to the second embodiment. In this case, the operation of almost continuously controlling a phase difference by the phase shifter 110 is not required, and the intensity of a target measurement light beam can be measured by two measurement steps.

Figure 19:
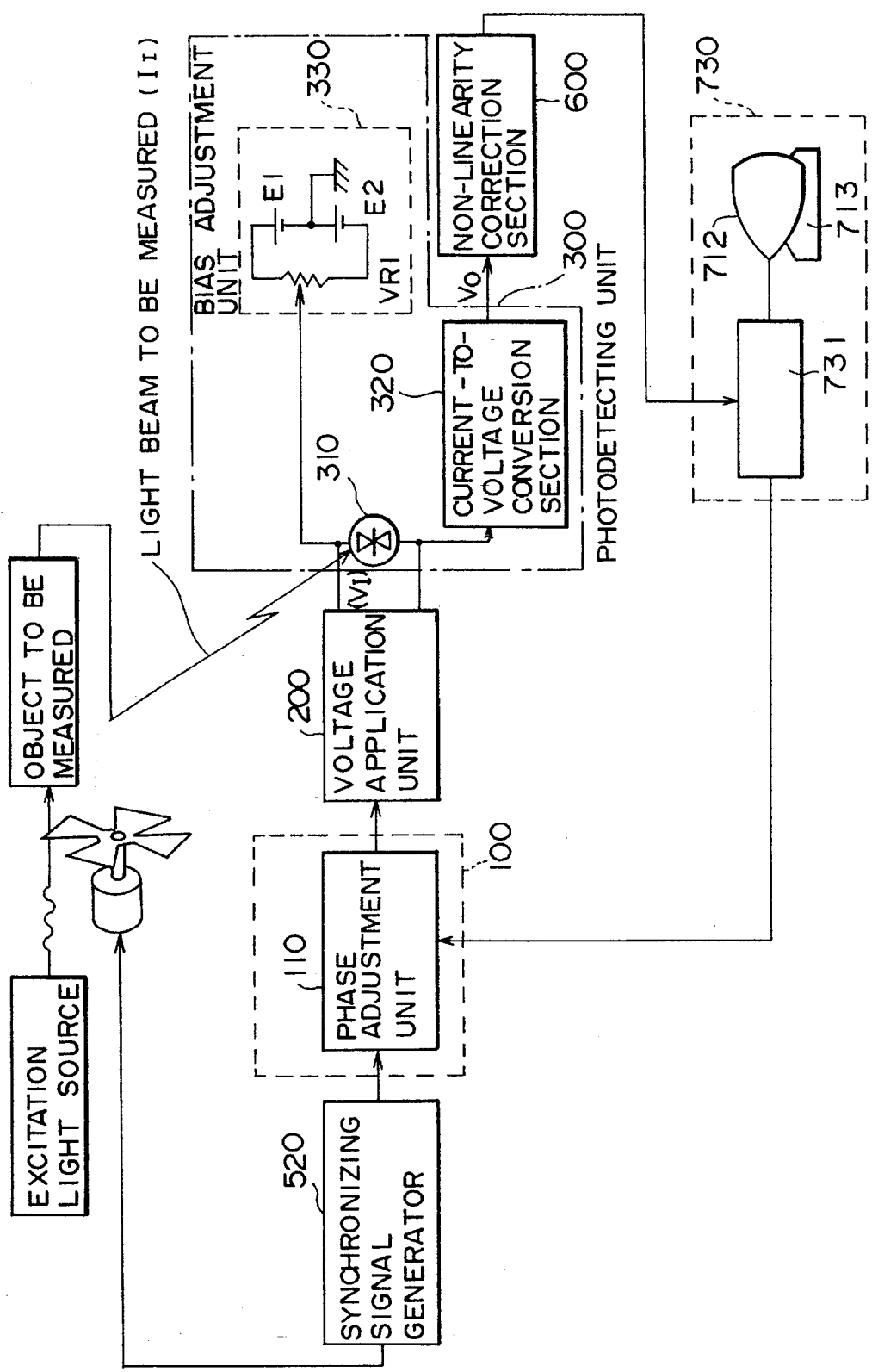
FIG. 19 is a block diagram showing a modification of the third embodiment of the present invention.

Similar to the third embodiment, the position of the modulator 840 is set merely between the generation source of a target measurement light beam and the photodetecting unit 300, and a distance from the photodetecting unit 300 need not be taken into consideration. However, a position where entrance of a noise component such as a background light beam to the photodetecting unit 300 can be minimized must be selected. Moreover, the fourth embodiment can be modified like the modification of the third embodiment in FIG. 19.

(Fifth Embodiment)

Figure 24:
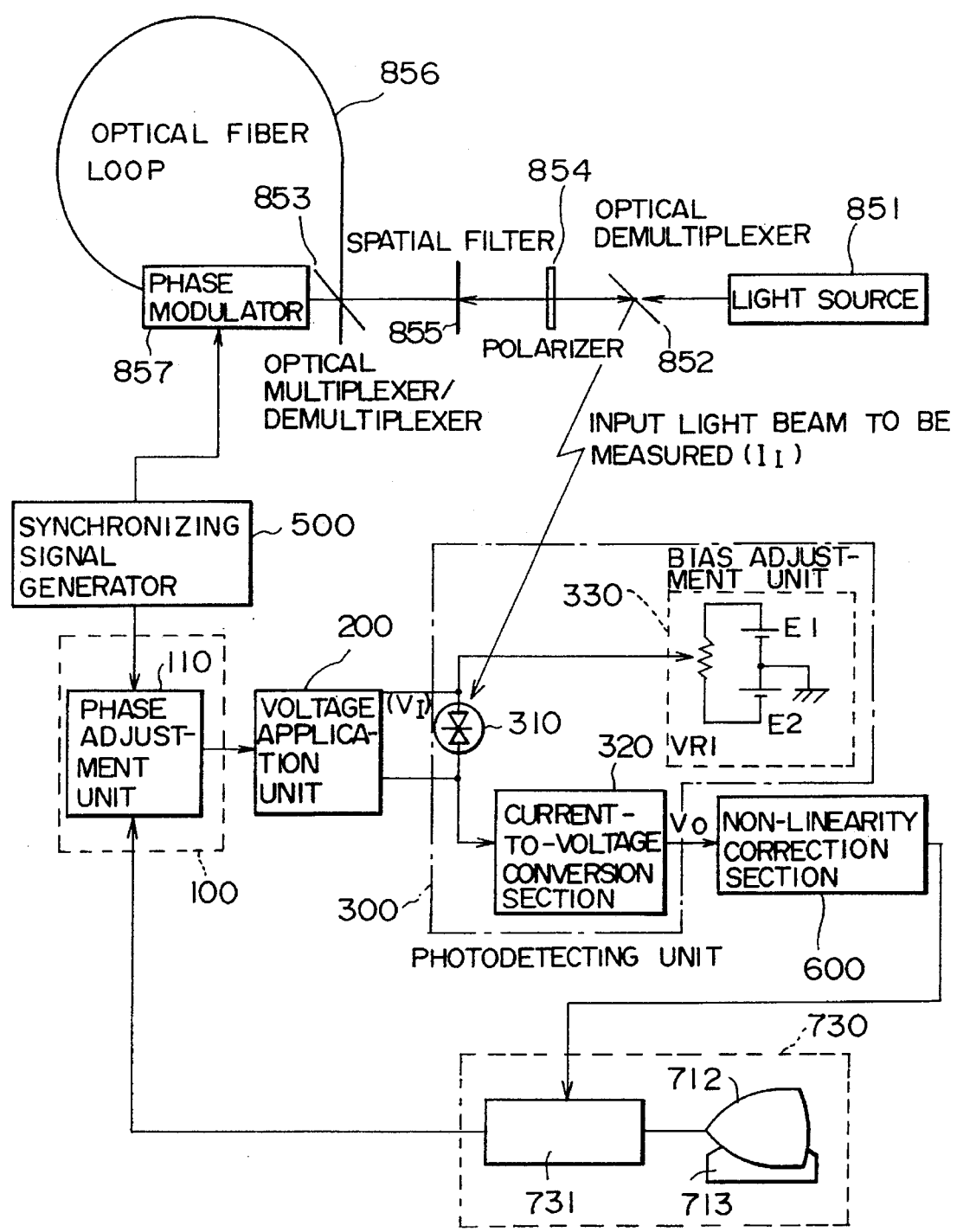
FIG. 24 is a block diagram showing the arrangement of a synchronous signal detection apparatus according to the fifth embodiment of the present invention.

FIG. 24 is a block diagram showing the arrangement of a synchronous signal detection apparatus according to the fifth embodiment of the present invention. This apparatus is an optical fiber gyro which can be used for position control of an aircraft. The optical fiber gyro detects a slight phase difference (Δθ) by the Sagnnac effect caused by rotation of an optical system to measure the rotational speed of the optical system. The value of the phase difference (Δθ) which must be detected is extremely small, i.e., $10^{-3}$ to $10^{-7}$ rad. For this reason, phase noise which enters the optical system must be greatly reduced. Further, electric circuits must faithfully detect a very small change in electrical signal upon receiving a light beam. Therefore, these electric circuits are required to have a high S/N ratio, a wide dynamic range, and a low drift level. Such an electric circuit is one of optimum devices to which the synchronous signal detection apparatus of the present invention is applied.

As shown in FIG. 24, a generation unit of a light beam to be measured in the apparatus of this embodiment is different from that of the third embodiment. That is, the generation unit of a light beam to be measured in the apparatus of this embodiment comprises ① a light source 851, ② a polarizer 854, ③ a spatial filter 855, ④ an optical multiplexer/demultiplexer 853, ⑤ a phase modulator 857, ⑥ an optical fiber loop 856, and ⑦ an optical demultiplexer 852. The polarizer 854 transmits only a specific polarized component of a light beam output from the light source 851. The spatial filter 855 selects only a component of a specific traveling direction of the light beam passing through the polarizer 854. The optical multiplexer/demultiplexer 853 demultiplexes the light beam passing through the spacial filter 855 into two light components. One of the light components obtained by demultiplexed the light beam by the optical multiplexer/demultiplexer 853 is input from the first terminal of the phase modulator 857, and the phase modulator 857 modulates the input light component at a frequency designated by a synchronizing signal generator 500 to output the modulated light component from the second terminal. At the same time, the other light component input from the second terminal is modulated in the same manner to output the modulated light component from the first terminal. The other light component obtained by demultiplexing the light beam by the optical multiplexer/demultiplexer 853 is input from one end face of the optical fiber loop 856, and the light component output from the second terminal of the phase modulator 857 is input from the other end face thereof. The light component (counterclockwise light component) which is input from one end face of the optical fiber loop to be output from the other end face thereof, and modulated by the phase modulator 857, and the light component (clockwise light component) which is input from the other end face of the optical fiber loop to be output from one end face thereof are multiplexed by the optical multiplexer/demultiplexer 853. The optical demultiplexer 852 reflects the multiplexed light beam sequentially passing through the spatial filter 855 and the polarizer 854 to guide the multiplexed light beam to a photoconductive photodetector 310. Note that the entire length of the optical fiber loop is adjusted such that the modulated phase of the counterclockwise light component differs from that of the clockwise light component by π/2.

First, an operator input the step value of a phase adjustment amount, and the like from an input operation unit 713. An arithmetic unit 731 which receives information of these measurement conditions designates an initial phase adjustment amount to the phase shifter 110. At the same time, the phase modulator 857 is started to operate. In this state, the light source 851 emits a light beam. The light beam output from the light source 851 reaches the light branch unit sequentially through the optical demultiplexer 852, the polarizer 854, and the spatial filter 855. One light component obtained by demultiplexing the light beam into two light components is input to the phase modulator 857 from the first terminal, and its phase is modulated. Then, the modulated light component is output from the second terminal to be input to the optical fiber loop 856 from the other end face. This light component becomes the clockwise light component. The other light component obtained by demultiplexing the light beam into two light components is input to the optical fiber loop 856 from one end face to be output from the other end face. Then, the light component is input to the phase modulator 857 from the second terminal, and its phase is modulated. The modulated light component is output from the first terminal to become the counterclockwise light component. After the clockwise and counterclockwise light components are multiplexed by the optical multiplexer/demultiplexer 853, the multiplexed light beam reaches the optical demultiplexer 852 sequentially through the spatial filter 855 and the polarizer 854. The multiplexed light beam reflected by the optical demultiplexer 852 is input to a photodetecting unit 300 as a light beam to be measured. When the photoconductive photodetector 310 receives the light beam to be measured, the photodetecting unit 300 outputs an almost DC voltage signal through a non-linearity correction unit 600. The arithmetic unit 731 acquires and stores the voltage value of this voltage signal.

Next, the arithmetic unit 731 calculates the step value of the phase adjustment amount in accordance with the frequency of the synchronizing signal. The arithmetic unit 731 designates a change in phase of the output signal corresponding to this step value to the phase shifter 110. In this state, the photoconductive photodetector 310 receives a light beam to be measured, and the arithmetic unit 731 acquires and stores the voltage value of a signal output from the non-linearity correction unit 600. Subsequently, the phase of a signal output from the phase shifter 110 is changed by the step value of the phase adjustment amount each time, and the arithmetic unit 731 acquires and stores the voltage value of a signal output from the non-linearity correction unit 600 each time.

When the accumulation of the changes in phases of the signals output from the phase shifter 110 reaches 2π, the arithmetic unit 731 processes the data of the stored voltage values to calculate the maximum voltage value. The arithmetic unit 731 recognizes this maximum voltage value as a measurement amount in accordance with the phase difference (Δθ), and calculates the phase difference (Δθ) from this measurement amount. In this manner, when the measurement operation of the phase difference (Δθ) is finished, the arithmetic unit 731 displays the measurement results on a display unit 712 and informed to the operator.

The present invention is not limited to the above embodiments, and can be modified without departing from the spirit and scope of the invention.

From the invention thus described, it will be obvious that the invention may be varied in many ways. Such variations are not to be regarded as a departure from the spirit and scope of the invention, and all such modifications as would be obvious To one skilled in the art are intended to be included within the scope of the following claims.

The basic Japanese Application No. 6-154,903 (154,903/1994) filed on Jul. 6, 1994 is hereby incorporated by reference.

What is claimed is:

1. A synchronous signal detection apparatus for measuring a frequency component of a signal to be measured, comprising;

a phase adjustment unit for receiving an electrical signal having a predetermined frequency, and changing a phase of an output signal in accordance with an external designation;

a voltage application unit for receiving the electrical signal output from said phase adjustment unit, and outputting a first voltage signal at a low output impedance;

a photoconductive photodetector, having a voltage application terminal to which the voltage signal output from said voltage application unit is input, for receiving the signal to be measured; and a current-to-voltage conversion unit for converting a current signal flowing through said photoconductive photodetector into a voltage signal, and extracting a substantially DC component to be output as a second voltage signal, wherein an intensity of a component of the predetermined frequency included in the signal to be measured is detected.

2. An apparatus according to claim 1, further comprising bias adjustment means for adjusting an operating bias voltage of said photoconductive photodetector.

3. An apparatus according to claim 1, further comprising a frequency selector for selecting the same frequency component as the predetermined frequency, and outputting the frequency component to said voltage application unit.

4. An apparatus according to claim 1, further comprising a data processing unit for informing said phase adjustment unit of an adjustment value, and receiving the second voltage signal output from said current-to-voltage conversion unit to calculate a phase and intensity of the signal to be measured.

5. An apparatus according to claim 1, further comprising non-linearity correction means for receiving the second voltage signal output from said current-to-voltage conversion unit, and correcting non-linearity of the voltage signal output from said current-to-voltage conversion unit with respect to an intensity of an input light beam, the non-linearity being inherent to response characteristics of said photoconductive photodetector.

6. An apparatus according to claim 1, wherein said photoconductive photodetector has an arrangement in which, when an intensity of an incident signal is constant and a value of an applied voltage is an independent variable, an amount of a current flowing through said photoconductive photodetector is a substantially odd function of the applied voltage in a predetermined domain including the value of the applied voltage of 0 V, and when the applied voltage is constant and a value of the intensity of the incident signal is an independent variable, the amount of the current flowing through said photoconductive photodetector is a substantially linear function of the intensity of the incident signal in the predetermined domain; and the voltage signal applied to said photoconductive photodetector is periodic and has a time average value of substantially zero and an amplitude represented by an even function of a time when an origin is set at time of a middle point between adjacent times in which the amplitude becomes zero.

7. An apparatus according to claim 6, wherein said photoconductive photodetector is a metal/semiconductor/metal photodetector.

8. An apparatus according to claim 6, wherein said photoconductive photodetector is a photodetector using one of GaAs, InP, GaP, InGaAs, HgCdTe, CdS, CdSe, and PbS as a photodetecting material.

* * * * *